United States Patent [19]

Maehara et al.

[11] Patent Number: 4,932,604
[45] Date of Patent: Jun. 12, 1990

[54] TAPE CARTRIDGE

[75] Inventors: Yoshimi Maehara, Kyoto; Mitsuhiro Chikuwa, Muko, both of Japan

[73] Assignee: Hitachi Maxell, Ltd., Osaka, Japan

[21] Appl. No.: 81,612

[22] Filed: Aug. 3, 1987

Related U.S. Application Data

[63] Continuation of Ser. No. 843,862, Mar. 24, 1986, abandoned, which is a continuation of Ser. No. 642,510, Aug. 20, 1984, abandoned.

[30] Foreign Application Priority Data

Aug. 22, 1983 [JP] Japan .................................. 58-130113

[51] Int. Cl.⁵ .......................................... G11B 23/087
[52] U.S. Cl. .................................... 242/199; 242/71.8
[58] Field of Search ....................... 242/71.8, 197–199; 360/132

[56] References Cited

U.S. PATENT DOCUMENTS 2,649,260  8/1953  Beneke ................................. 242/77.4
3,869,099  3/1975  Inaga .................................... 242/199
4,203,564  5/1980  Nemoto .............................. 242/71.8
4,485,990 12/1984  Ogiro et al. ......................... 242/199

FOREIGN PATENT DOCUMENTS 1211461  2/1966  Fed. Rep. of Germany ..... 242/71.8
 675912  2/1930  France ............................... 242/77.3
 463534  5/1951  Italy .................................... 242/71.8
 186180 10/1984  Japan ................................. 242/199

Primary Examiner—David Werner
Attorney, Agent, or Firm—Birch, Stewart, Kolasch & Birch

[57] ABSTRACT

In a tape reel for use in a recording tape cartridge for winding a recording tape, there are formed a plurality of radial grooves on the upper face of a lower flange of the tape reel and projected ribs on the lower face corresponding to the grooves so that the wall thickness of the lower flange can be generally equal over the entire area to improve the flow of the plastic resin material during the molding process and to exhaust unwanted air.

2 Claims, 4 Drawing Sheets

TAPE CARTRIDGE

This application is a continuation of application Ser. No. 843,862 filed on March 24, 1986 abandoned, which is a continuation of Ser. No. 642,510, filed on August 20, 1984 abandoned.

FIELD OF THE INVENTION

The present invention relates to a tape cartridge having a case and tape reels rotatably mounted in the case for winding a recording tape and more specifically to an improved configuration of the tape reels.

BACKGROUND OF THE INVENTION

Generally, a tape reel used in a recording tape cartridge such as a video tape cartridge comprises an upper flange and a lower flange with which both top and bottom edges of the recording tape are guided. The inside surfaces of both the top flange and the bottom flange are formed generally flat and the outside surfaces thereof are formed either flat or with radial reinforcing ribs.

However, in the case where such ribs are provided on the flanges of the tape reel, during the molding process, plastic resin materials is injected at a position of the die corresponding to the center of a tape reel and flow into the space for the flange and the ribs. In this case, there may occur a different flow of the plastic resin material for the ribs and the other parts, such as the flat wide flange portion due to a difference of thickness between the ribs and the flat flange portion, so that there may occur defective filling of the plastic resin material or internal strain due to the difference of shrinkage of the plastic resin material during the process of cooling of the casting mold. In the case where the ribs are not formed on the flanges, i.e., the flanges are flat, the flanges have to be made rather thick so as to maintain the mechanical strength of the flanges, thereby producing the disadvantage of lowering the moldability of the tape reels. Furthermore, it is difficult to make the over all surfaces of the flange flat.

Further, in a case where the entire inside surfaces of the flanges are flat, the area of the flanges contacting the tape edges becomes large and the tape edges are apt to be damaged. With the whole inside surface of the respective tape reel flanges being flat without radial ribs, when the recording tape is taken up by the tape reel at a high speed, air which once occupies a space between the bottom edge of the roll of the recording tape and the flange acts to raise a part of the recording tape layers to deteriorate tight winding of the roll of the recording tape, providing irregular winding of the recording tape. Tight winding of the tape is also effected by air enclosed between the laminated wound tape layers.

SUMMARY OF THE INVENTION

Accordingly, an essential object of the present invention is to provide a recording tape cartridge having a tape reel arrangement which is easy to manufacture with a high geometric precision and high mechanical strength.

Another object of the present invention is to provide a tape reel for use in a recording tape cartridge with a thin flange portion for enabling a decrease in the necessary volume of the plastic resin material and to improve the productivity or moldability of the tape reel.

A further object of the present invention is to eliminate irregular tape winding by eliminating air between the bottom edge of the tape and associated flange and purging the air between the respective wound tape through a plurality of grooves formed in the inner face of the flange which extend radially from a core to a peripheral edge portion of the respective flange.

According to the present invention, there is provided a tape cartridge comprising a cartridge case 1 for containing tape reels 3 on which a tape 2 is to be wound, each of the tape reels 3 comprising a reel core 5 having a circular outer peripheral wall surface 4 and flange 7 having a generally flat part 13 for slidably supporting the lower edges portions of the tape 2, the tape cartridge being characterized in that the flange 7 is provided with a plurality of grooves 11 each extending radially from a position near the reel core 5 to a position near the outer peripheral edge of the flange 7 with a predetermined interval in the circumferential direction forming a plurality of projected ribs 12 on the opposite surface of the flange 7 so that the entire flange 7 has generally an equal thickness and the outer peripheral edge portion 15 of the flange 7 is formed without a groove so that the outer peripheral edge portion 15 is formed flush with the flat part 13.

DETAILED DESCRIPTION OF THE INVENTION

Figure 1:
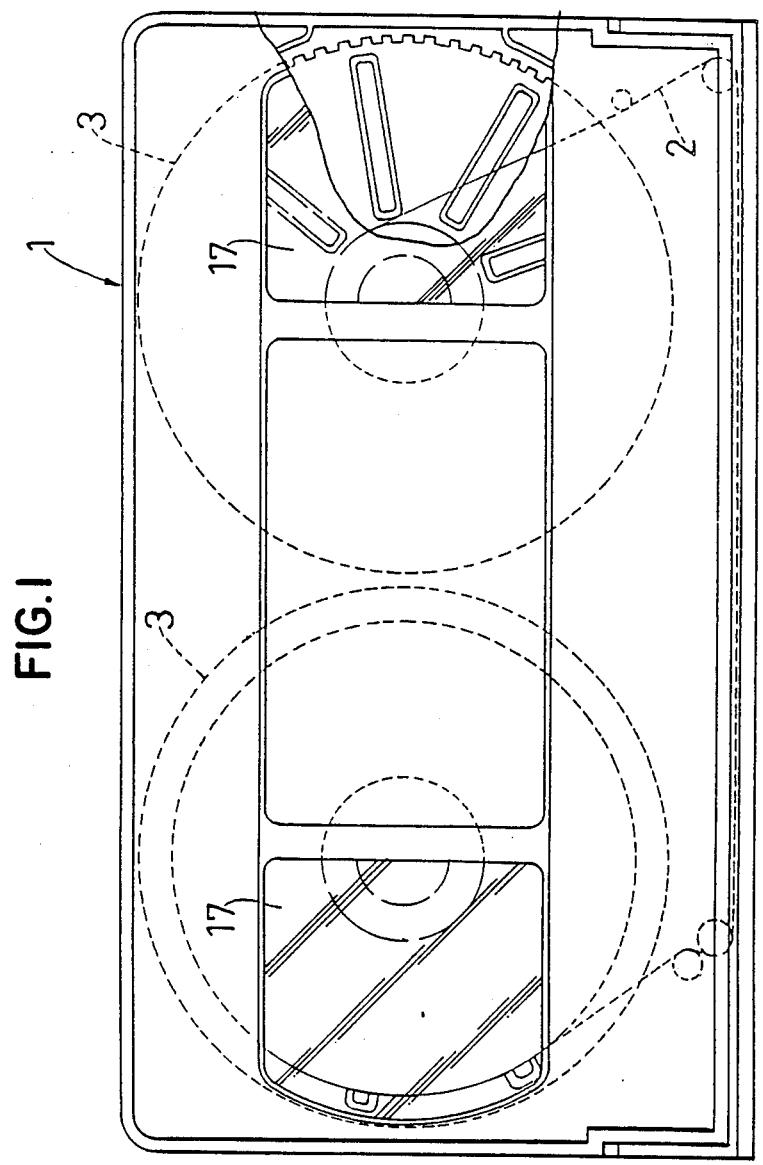
FIG. 1 is a plan view showing one preferred embodiment of a recording tape cartridge according to the present invention with a part broken.

FIG. 1 illustrates a tape cartridge for video recording. In the inside of the cartridge case 1 there are rotatably provided a pair of tape reels 3 so as to have a recording tape 2 taken out from one tape reel 3 to the front portion of the cartridge case 1 and taken up onto the other tape reel 3.

Figure 2:
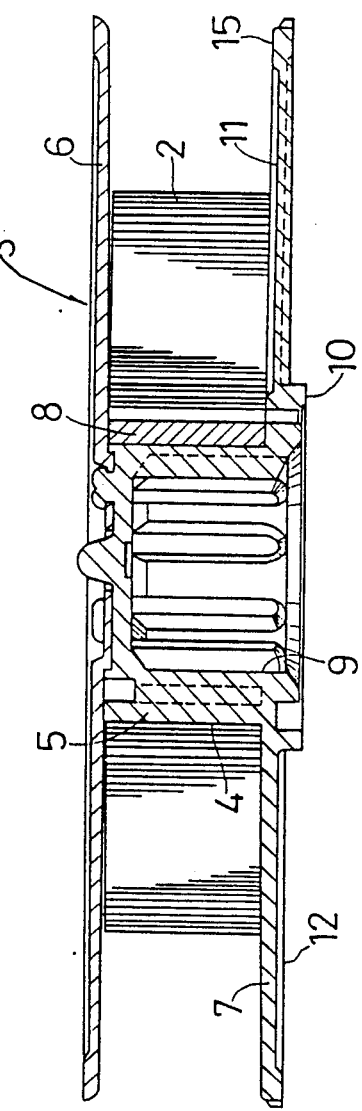
FIG. 2 is a cross sectional view showing one preferred embodiment of a tape reel used in the recording tape cartridge shown in FIG. 1.
Figure 3:
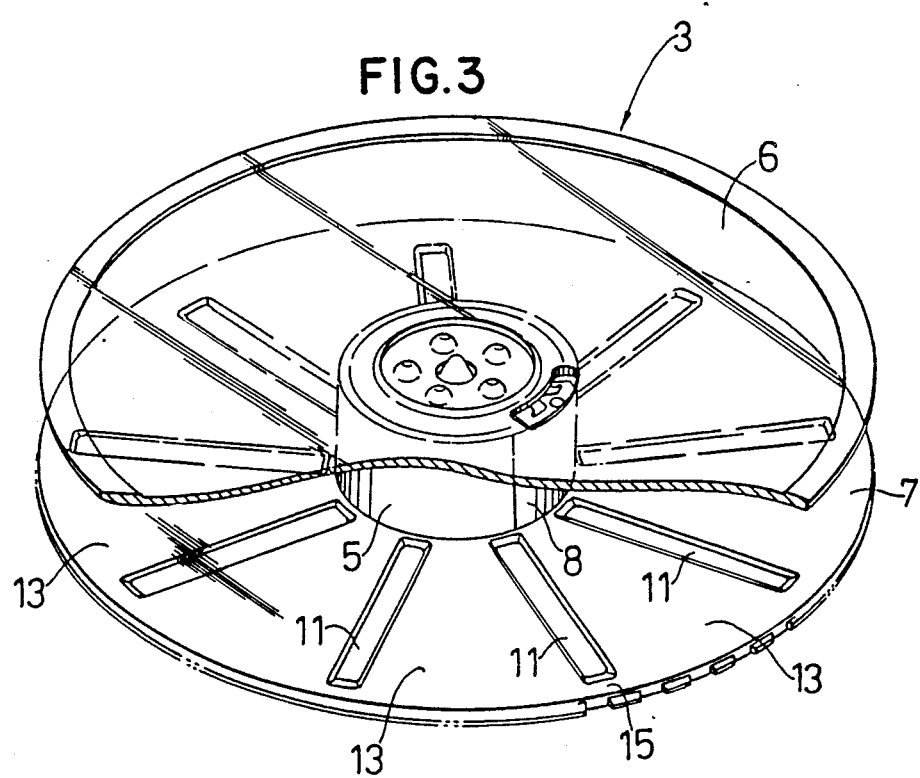
FIG. 3 is a perspective view seen from the upper side of the tape reel shown in FIG. 1 with a part broken.
Figure 4:
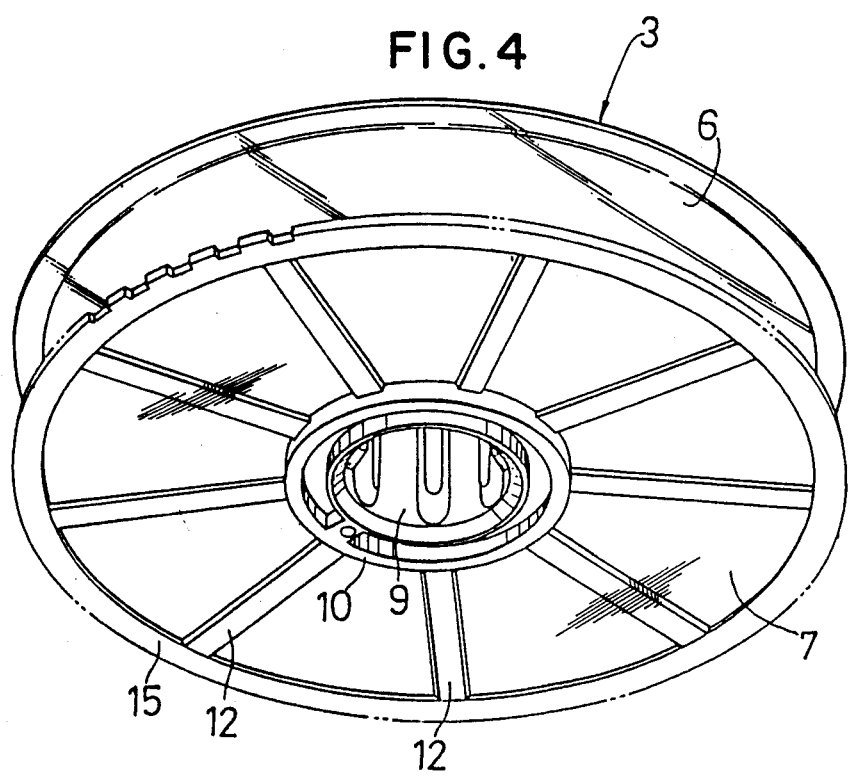
FIG. 4 is perspective view seen from the lower side of the tape reel shown in FIG. 1.

In FIGS. 2 to 4, each of the tape reels 3 has flanges 6, and 7 at the top and the bottom of the reel core 5 which has a cylindrical outer peripheral wall 4. The reel core 5 and the lower flange 7 are molded in one-piece using plastic resin materials, and the upper flange 6 is molded as a separate member with a transparent plastic resin material. Thereafter, it is combined by caulking at the upper end of the reel core 5 by supersonic wave welding. One end portion of the recording tape 2 is clamped to a portion of the reel core 5 using a clamp piece 8. At the central portion of the reel core 5, a drive shaft insertion hole 9 is defined so as to receive a drive shaft of a video deck (not shown) from below. A reference surface 10 in the form of an annular rib is projectingly formed on the lower end face of the reel core 5 surrounding the drive shaft insertion hole 9.

Figure 6:
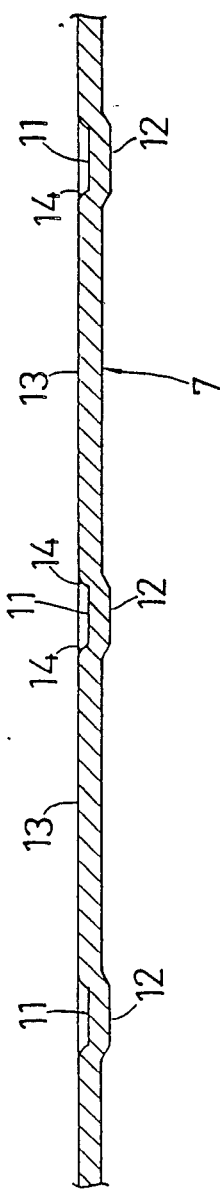
FIG. 6 is a cross sectional view taken along the lines VI—VI in FIG. 5.
Figure 5:
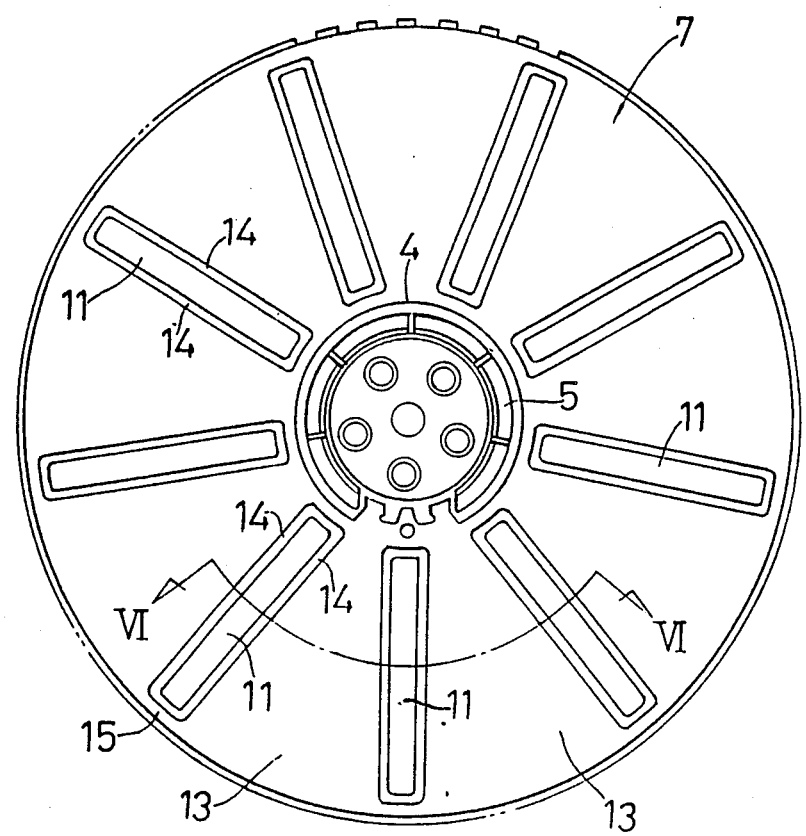
FIG. 5 is a plan view showning the inside surface of the tape reel shown in FIG. 1.

Referring to FIGS. 5 and 6, a plurality of grooves 11 are defined so as to radially extend on the inside or upper surface of the lower flange 7 which the lower edge of the recording tape 2 is slidably supported. The respective grooves 11 radially extend between the inner positions near the reel core 5 and the outer positions near the outer peripheral edge of the lower flange 7 with predetermined angular spaces in the circumferential direction. There are formed a plurality of ribs 12 on the outer or lower surface of the lower flange 7 complementary to the grooves 11. The flat areas 13 and the bottom wall of the grooves 11 in the lower flange 7 are continued in a circumferential direction with approximately the same wall thickness. The boundary 14 between the groove 11 and the flat area 13 is formed as a smooth curved surface, so that the flow of the plastic resin material is smooth when the tape reel is molded so as to assure a smooth contact between the recording tape edge and the surface of the lower flange 7 for preventing damage to the recording tape. The upper surface of the outer peripheral annular portion 15 of the lower flange 7 on which the grooves are not formed, is formed into a flat surface which is continuous and flush with the surface of the flat area 13 over the whole circumference. The outer peripheral annular portion 15 of the lower flange 7 has also a uniform wall thickness over the whole circumference of the lower flange. In a preferred embodiment, the inside or upper surface of the lower flange 7 is inclined slightly downwardly with the central portion of the flange being higher than the outer peripheral portion. In this arrangement, it is noted that, except for the grooved portion, the peripheral annular portion 15 on the upper surface of the lower flange 7 is so defined that each position on the same circle coaxial with the center of the flange has the same height relative to the reference surface 10.

In the illustrated embodiment, the upper flange 6 is made transparent, and the cartridge case 1 is provided on its upper surface with a transparent window 17, so that an operator can see the rotation of the tape reels 3, especially the direction of rotation thereof together with the tape winding volume, by seeing a part of the groove 11 which is not concealed by the roll of the recording tape 2 from outside of the cartridge case 1. However, in the tape reel 3, the upper flange 6 is not absolutely necessary. The present invention may be applicable to a so-called one flange type tape reel. It is desirable that the reel core 5 and the lower flange 7 be molded in one-piece by a plastic resin material. However, they may respectively be molded separately and then combined in one-piece by caulking by supersonic welding, or by the aid of an adhesive. Besides, the grooves 11 are not necessarily formed radially at equal intervals. It may be possible to form a couple of symmetric grooves 11 so as to extend radially on opposite areas with respect to the center of the tape reel 2. The grooves 11 may be slightly separated from the reel core 5 as illustrated, but may be continued to the reel core 5.

It is one advantage of the present invention that since the lower flange of the tape reel is formed having a generally equal thickness by providing the radial grooves on the surface for supporting the recording tape and the projected ribs complementary to the grooves on the opposite surface of the flange, whereby during molding of the tape reel, flow of the plastic resin can be improved so that the flange can be molded without undesired deformation, resulting in improving the geometric accuracy of the tape reel, thus the tape can be regularly wound by the help of the grooves through which undesired air can be exhausted.

Also by providing the grooves and ribs on the flange, the tape reel can be made as thin as possible while maintaining a desired mechanical strength, so that when manufacturing the tape reel, the volume of the material and the production cost can be decreased.

The invention being thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. A tape cartridge comprising:
    a tape case and tape reels rotatably mounted in said case, each of said tape reels comprising:
    a cylindrical reel core around which a thin strip like tape is to be wound in layers,
    a top flange secured to a top end of said reel core having a central portion and an outer peripheral portion, and
    a bottom flange secured to a bottom end of said reel core having a central portion and an outer peripheral portion,
    said top flange being substantially the same size as said bottom flange, said bottom flange having an inner surface which is generally flat for slidably supporting a lower edge of said tape and is inclined with respect to said top flange slightly downward and outward from said reel core such that the distance between said outer peripheral portions of said top and bottom flanges is greater that the distance between said central portions of said top and bottom flanges so as to provide a clearance between said top flange and a top edge of said wound tape, the central portion of said bottom flange being higher with respect to said outer peripheral portion of said bottom flange,
    said inner, upper surface of said bottom flange being provided with a plurality of grooves at predetermined intervals in a circumferential direction, each groove extending radially from a first position near said reel core to a second position near a peripheral edge of said bottom flange forming a plurality of corresponding projected ribs on an opposite outer, lower surface of said bottom flange, said inner, upper surface of said bottom flange being continuous with that portion of said surface between said second position and said reel core and the surface between said second position and said peripheral edge such that each of said grooves does not extend entirely to the core of said reel or the peripheral edge of said bottom flange, wherein said bottom grooves are so constructed and arranged such that air collected between said wound layers of said tape to escapes through the grooves such that said tape is wound in a regular manner around said tape reels.

2. The tape cartridge of claim 1, wherein in each of said tape reels, boundaries between said respective grooves and said respective inner surfaces of said bottom flanges are formed as smooth curved surfaces.

* * * * *